United States Patent [19]

Cain et al.

[11] Patent Number: 5,288,513
[45] Date of Patent: Feb. 22, 1994

[54] NON-TEMPER FILLING FATS

[75] Inventors: Frederick W. Cain, Voorburg; Franciscus Duurland, Loenen a/d Vecht; Bettina Schmidl, Alkmaar; Joke Ten Wolde-Hakvoort, Zaandam, all of Netherlands

[73] Assignee: Van den Bergh Foods Co., Division of Conopco, Inc., Lisle, Ill.

[21] Appl. No.: 16,361

[22] Filed: Feb. 11, 1993

[30] Foreign Application Priority Data

Feb. 12, 1992 [EP] European Pat. Off. ........ 92200387.6

[51] Int. Cl.$^5$ .............................................. C07C 53/00
[52] U.S. Cl. ..................................... 426/660; 554/227
[58] Field of Search ......................... 554/227; 426/660

[56] References Cited

U.S. PATENT DOCUMENTS

| | | | |
|---|---|---|---|
| 3,492,130 | 1/1970 | Harwood | 426/607 |
| 4,199,611 | 4/1980 | Toyoshima et al. | 426/607 |
| 4,364,868 | 12/1982 | Hargreaves | 554/227 |
| 4,388,339 | 6/1983 | Lomneth et al. | 426/607 |
| 4,390,561 | 6/1983 | Blair et al. | 426/607 |
| 4,447,462 | 5/1984 | Tafuri et al. | 426/601 |
| 4,702,928 | 10/1987 | Wieske et al. | 462/607 |
| 4,876,107 | 10/1989 | King et al. | 426/601 |
| 4,996,074 | 2/1991 | Seiden et al. | 426/601 |
| 5,023,101 | 6/1991 | Sugihara et al. | 462/603 |
| 5,104,680 | 4/1992 | Padley et al. | 426/602 |

FOREIGN PATENT DOCUMENTS

| | | |
|---|---|---|
| 0023062 | 1/1981 | European Pat. Off. |
| 0347006 | 12/1989 | European Pat. Off. |
| 0354025 | 2/1990 | European Pat. Off. |
| 1564363 | 4/1980 | United Kingdom |

OTHER PUBLICATIONS

Abstract of JP 55-114261 Mar. 9, 1980.
Abstract of JP 55-034052 Mar. 11, 1980.
Abstract of FR 2334747 Aug. 12, 1977.

*Primary Examiner*—Paul J. Killos
*Assistant Examiner*—Joseph M. Conrad, III
*Attorney, Agent, or Firm*—Rimma Mitelman

[57] ABSTRACT

Fat compositions, comprising:
- 35-80 wt % SUS
- less than 5 wt % S3
- 7-60 wt% ($U_2S+U_3$)
- less than 40 wt % SSU
whereas: weight ratio $$\frac{SUS}{SSU} < 6$$

wherein
S=saturated fatty acids $C_{16}$–$C_{18}$
S'=saturated fatty acids $C_{10}$–$C_{24}$
U=unsaturated fatty acids $C_{16}$–$C_{22}$
are excellent cool-melting, non-temper, non-trans filling fats.

7 Claims, No Drawings

NON-TEMPER FILLING FATS

Non-temper confectionery fats consisting substantially of triglycerides that are capable of crystallization in the β-crystal form and contain an externally added, minimal working amount of a fat component that is itself capable of stabilizing β'-crystals, wherein the fat component capable of stabilizing the β'-crystals comprises at least a vegetable triglyceride of the SSO-type and/or a triglyceride of the $S_3$-type (S=saturated fatty acid $C_{10}$-$C_{24}$; O=oleic acid), are the subject of British Patent Application 9121578.0.

Although the use of these fat blends in confectionery products is mentioned in this British Patent Application, application of the fats in filling fats is only disclosed in a very generic sense. Fat blends for filling fats need to be softer than fat blends for other confectioneries.

From U.S. Pat. No. 3,492,130 triglyceride compositions are known that are temperable and that are good compatible with cocoa butter. These compositions contain 70-95 wt % SOS-fats, 5-30 wt % SUU+SSU (1:1)-fats and about 1% SSU/U$_2$S-fats. In EP 78,568 margarine fats are disclosed that comprise 3-9% $S_3$; 32-50% SUS, 5-12% SSU and 20-32% SOO/SLS fats. According to EP 347,006 fats for butter-like spreads are composed of 1-9% $S_3$; 30-50% SOS; 5-12% SSO, while the remainder consists of SOO and SLS-fats. In none of these references an application of the fats as filling fats is mentioned, while also the role of the SUS/SSU ratio for the product properties was not understood.

We have now found a new cool-melting, non-temper, non-trans filling fat comprising a fat blend having the following composition :
- 35-80 wt. %, preferably 51-80 wt. %, and most preferably 55-70 wt % of SUS;
- less than 5 wt. %, preferably less than 3 wt. %, of $S_3'$;
- 7-60 wt %, preferably 10-50 wt % of (U$_2$S+U$_3$)
- less than 40 wt. % of SSU;
- the weight ratio $$\frac{SUS}{SSU} \text{ being} < 6,$$

wherein
S=saturated fatty acid having 16-18 C atoms;
S'=saturated fatty acid having 10-24 C atoms;
U=unsaturated fatty acid having 16-22 C atoms, in particular $C_{18:1}$.

The preferred fat compositions are derived from palm fat so that the SUS component of the fat is mainly POP. Therefore, our new fats contain at least 35 wt. % of $C_{16:0}$, in particular at least 45 wt. % of $C_{16:0}$, and less than 8 wt. % of $C_{18:0}$, in particular less than 6.5 wt. %.

The SSU component of the fat blend is preferably a PPO fat (P=palmitic; O=oleic). These fats are obtainable by an enzymic process as described in our European Patent Applications EP 209 327 and 91300496. However, also StSTO, as obtainable according to European Patent Application 9130551.6, can be applied (St=Stearic).

The $S_3'$ component of our new compositions might contain one type of fatty acid; however, it is preferred to use $S_3'$ of the type $S_1S_2S_1$, wherein $S_1$ and $S_2$ are both saturated fatty acids having $C_{10}$-$C_{24}$; however, the carbon numbers of $S_1$ and $S_2$ differ by at least two. An example thereof is PStP, which is obtained by the hardening of a palm mid-fraction. It should be emphasized that the maximum amount of $S_3'$ present in the composition is 5 wt %. If a fat blend, however, contains only minor amounts of $S_3'$ and problems arise upon crystallisation of the fat, it is possible to raise the $S_3'$ content, however, remaining below the maximum amount of 5 wt %.

Very suitable fat blends display $N_{20}$ (not-stab; NMR-pulse) values of at least 20, preferably at least 40%. These values are measured after subjecting the fat to the following T-regime: melt at 80° C.; cooling from 80° C. to 60° C.; keep it 10 min. at 60° C., 1 hr at 0° C.; 0.5 hr at 20° C.

Our invention also concerns confectionery products consisting at least partly of a filling fat, wherein the fat component of the filling fat has the composition of our new cool-melting, non-temper, non-trans filling fats.

The fillings can further contain cocoa powder, milk powder, such as full cream milk powder (=FCMP), sugar and emulsifier, e.g. lecithin.

The following Examples will illustrate our invention further.

EXAMPLE I

Chocolate filling compositions were prepared according to the following recipe :

| | |
|---|---|
| Dark chocolate | 18 wt. % |
| Fat blend | 47 wt. % |
| FCMP | 10 wt. % |
| Sugar | 25 wt. % |
| Lecithin | 0.4 wt. % |
| Total fat content: | 55.5 wt. % |

In these compositions, fat blends A, B and C were applied; the composition of these fats is given in Table I.

TABLE I

| | Blend A | B** | C |
|---|---|---|---|
| $S_3$ | 2.6 | 2.2 | 2.3 |
| SUS | 77.7 | 67.7 | 70.6 |
| SSU | 16.0 | 13.7 | 14.3 |
| $U_2S + U_3$ | 4.6* | 17.9 | 14.4 |
| SUS/SSU | 4.8 | 4.9 | 4.9 |
| $C_{16:0}$ | 55.3 | 51.1 | 52.2 |
| $C_{18:0}$ | 6.9 | 6.1 | 6.4 |

*not according to invention.
**$N_{20}$ (n.s.) = 61

The fillings were prepared by mixing of the dark chocolate, the FCMP and the sugar in a Hobart mixer at 50° C. with about 15% of the amount of fat (A, B and C) on product. The mixture was refined in a triple roller mill. The remainder of the fat and the lecithin were mixed with the blend thus obtained in a Hobart mixer at 50° C. The filling was cooled to 30° C. and poured into aluminium cups.

The fillings were placed in cabinets at 20° C. and at 25° C. and stored for 2 months.

After storage for 1 week at 20° C., the samples were evaluated by a trained taste panel. A scale from 1 to 9 was set up for hardness, meltdown and coolness, the scale being:

| | |
|---|---|
| Hardness:1 = soft | 9 = very hard |
| Meltdown:1 = very slow | 9 = very fast |
| Coolness:1 = not cool | 9 = very cool |

The results were:

| Sample | A | B | C |
|---|---|---|---|
| Hardness | 9.0 | 4.0 | 4.5 |
| Meltdown | 2.0 | 6.5 | 5.5 |
| Coolness | 2.0 | 5.0 | 5.5 |

Consequently, sample A was too hard, had a slow meltdown and was not cool.

After storage of the samples for 1 month at 20° C. or 25° C., no bloom was found.

EXAMPLE 2

Another filling was prepared by mixing of cocoa powder, FCMP, sugar and about 20% of the fat on product in a Hobart mixer at 20° C. The mixture was refined in a triple roller mill and conched for three hours at 50° C. along with a further 15% of the fat on product. The lecithin and the remaining fat were added and the filling was conched for a further hour. It was cooled to 30° C. and poured into aluminium cups. The fillings were placed in cabinets at 20° C. and at 25° C. and stored for 2 months. Consequently, the following recipe was use:

| Cocoa powder 10/12 | 13 wt. % |
|---|---|
| Fat blend | 52 wt. % |
| FCMP | 10 wt. % |
| Sugar | 25 wt. % |
| Lecithin | 0.4 wt. % |
| Total fat | 55.8 wt. % |

The fat blends applied were fats D and C (see Table II).

TABLE II

| | Blend D | C** |
|---|---|---|
| $S_3$ | 1.5 | 2.3 |
| SUS | 61.2 | 70.6 |
| SSU | 6.0 | 14.3 |
| $U_2S + U_3$ | 31.8 | 14.4 |
| SUS/SSU | 10.2* | 4.9 |
| $C_{16:0}$ | 46.9 | 51.2 |
| $C_{18:0}$ | 5.4 | 6.4 |

*not according to invention
**$N_{20}$ (n.s.) = 66

An evaluation of the samples with fats D and C resulted in a coolness value after 1 week at 20° C. of:
4.0 for sample D
6.3 for sample C After 1 month' storage at 20° C. and 25° C., sample D showed bloom, whereas sample C showed no trace of bloom.

We claim:

1. Cool-melting, non-temper, non-trans filling fat comprising a fat blend having the composition :
% SUS=35-80 wt. %, preferably 51-80 wt. %;
% $S_3'$=less than 5 wt. %, preferably less than 3 wt. %;
% ($U_2S+U_3$)=7-60 wt. %, preferably 10-50 wt. %;
% SSU=less than 40 wt. %.
weight ratio $$\frac{SUS}{SSU} < 6$$

wherein
S=saturated fatty acid having 16-18 C atoms;
S'=saturated fatty acid having 10-24 C atoms;
U=unsaturated fatty acid having 16-22 C atoms, in particular $C_{18:1}$.

2. Cool-melting, non-temper, non-trans filling fat according to claim 1, wherein the fat blend has an SUS-content of 55-70 wt %.

3. Cool-melting, non-temper, non-trans filling fat according to claim 1, wherein the SUS component is derived from a palm fat.

4. Cool-melting, non-temper, non-trans filling fat according to claim 1, wherein the fat contains at least 35 wt. % of $C_{16:0}$ and less than 8 wt. % of $C_{18:0}$.

5. Cool-melting, non-temper, non-trans filling fat according to claim 4, wherein the $C_{16:0}$ content is at least 45 wt. % and the $C_{18:0}$ content is less than 6.5 wt. %.

6. Cool-melting, non-temper, non-trans filling fat according to claim 1, wherein the fat blend displays an $N_{20}$ (n.s.) of at least 20, preferably at least 40.

7. Confectionery product consisting at least partly of a filling fat, wherein the fat component of the filling fat has a composition according to claim 1.

* * * * *